United States Patent [19]

Hickox

[11] 4,249,096

[45] Feb. 3, 1981

[54] ELECTRICAL DYNAMO

[76] Inventor: Barbara Hickox, P.O. Box 781, Ventura, Calif. 93001

[21] Appl. No.: 32,145

[22] Filed: Apr. 23, 1979

[51] Int. Cl.³ .............................................. H02K 33/00
[52] U.S. Cl. .................................... 310/15; 310/168; 290/1 R; 322/3
[58] Field of Search ................. 290/1, 44, 54; 310/15, 310/20, 46, 168, 80, 103, 69, 75 A; 322/3

[56] References Cited

U.S. PATENT DOCUMENTS

| | | | |
|---|---|---|---|
| 2,479,699 | 8/1949 | Powell | 310/15 |
| 3,497,133 | 2/1970 | Childress et al. | 290/1 R X |
| 3,507,580 | 4/1970 | Howard et al. | 290/1 R |
| 3,760,205 | 9/1973 | Imris | 310/168 |
| 3,801,841 | 4/1974 | Hull | 310/80 X |
| 4,011,477 | 3/1977 | Scholin | 310/80 |
| 4,155,022 | 5/1979 | Crockett | 310/168 |

Primary Examiner—Donovan F. Duggan
Attorney, Agent, or Firm—Fulwider, Patton, Rieber, Lee & Utecht

[57] ABSTRACT

An electrical generator is formed with at least one nonconductive cylinder mounted for rotation about an axis and containing four pairs of permanent magnets, longitudinally spaced within the cylinder and angularly offset from each other in a helical array. Each of the magnets in each pair is radially disposed in the cylinder opposite the other and separated from the other at the cylinder axis with like poles facing each other. An electrical secondary is provided within the magnetic field of the magnets in the cylinder. A ring magnet is oriented with an axis parallel to the cylinder axis and is relatively movable therealong. The magnetic fields acting between the ring magnet and the magnets in the cylinder rotates the cylinder to induce electrical current in the generator secondary.

13 Claims, 11 Drawing Figures

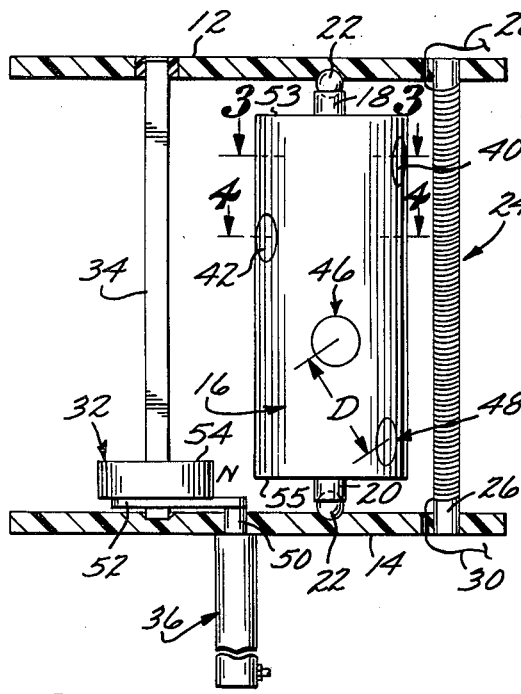
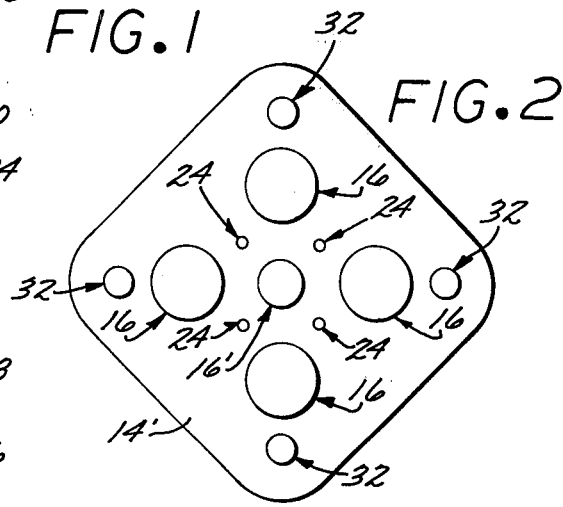
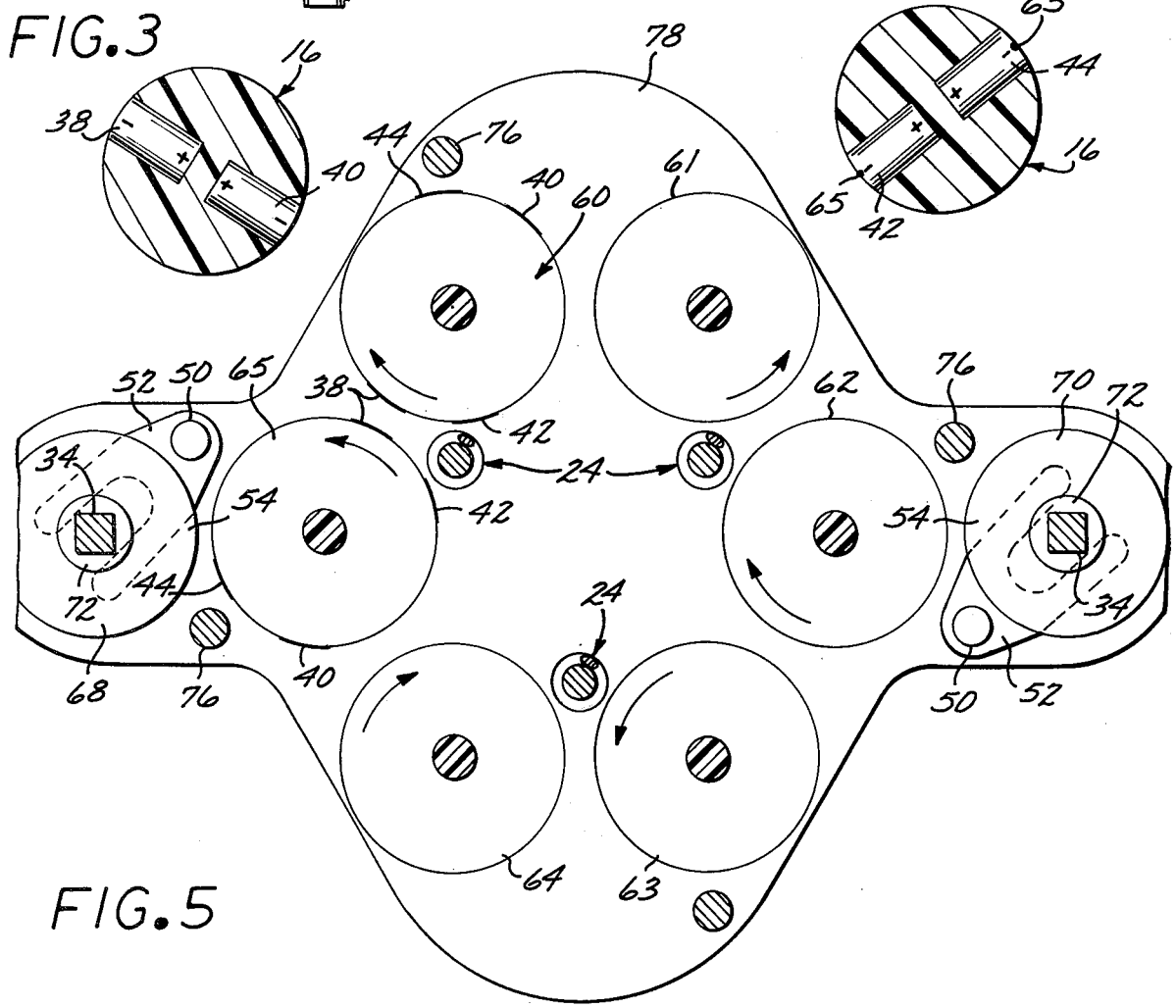

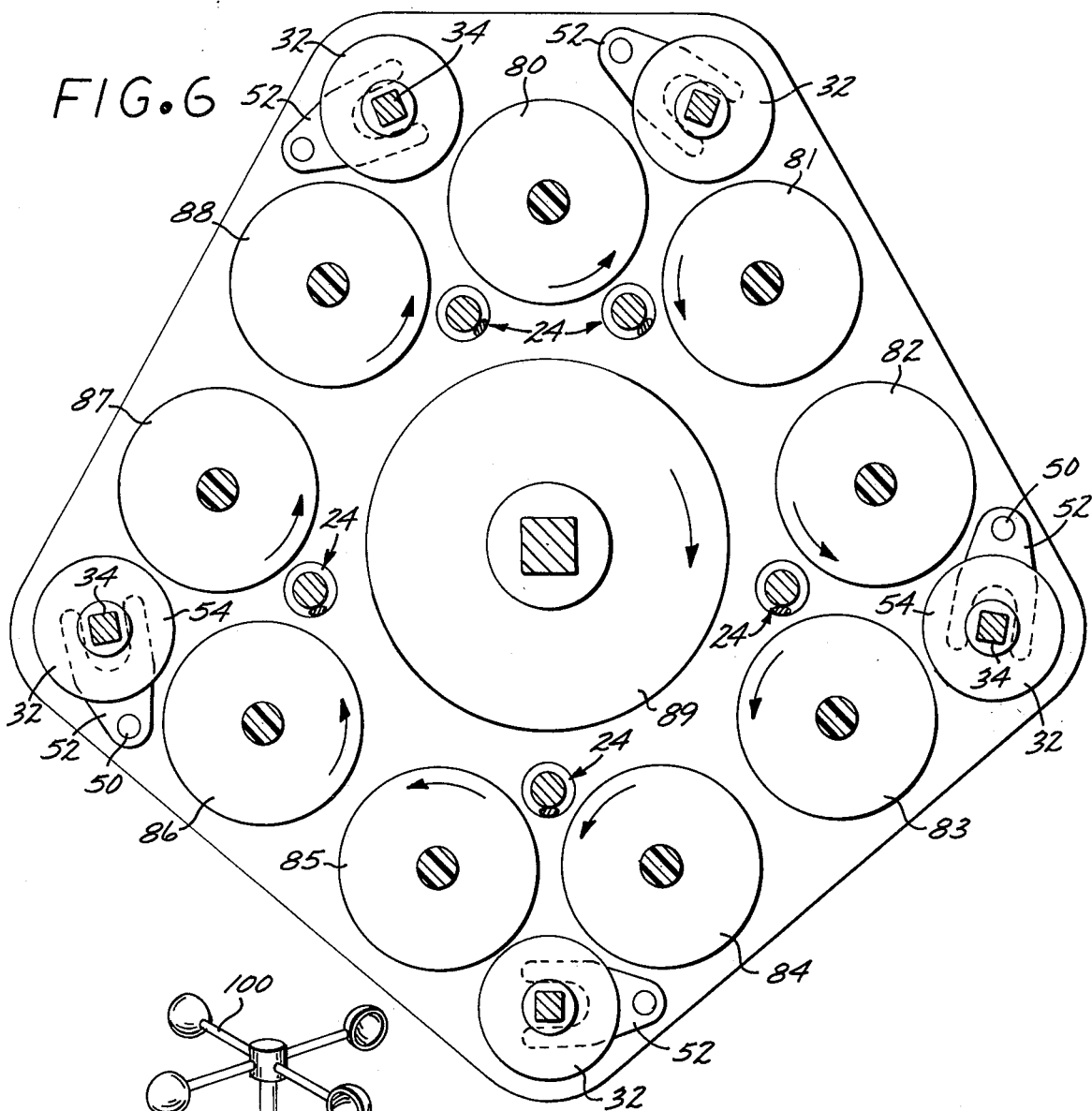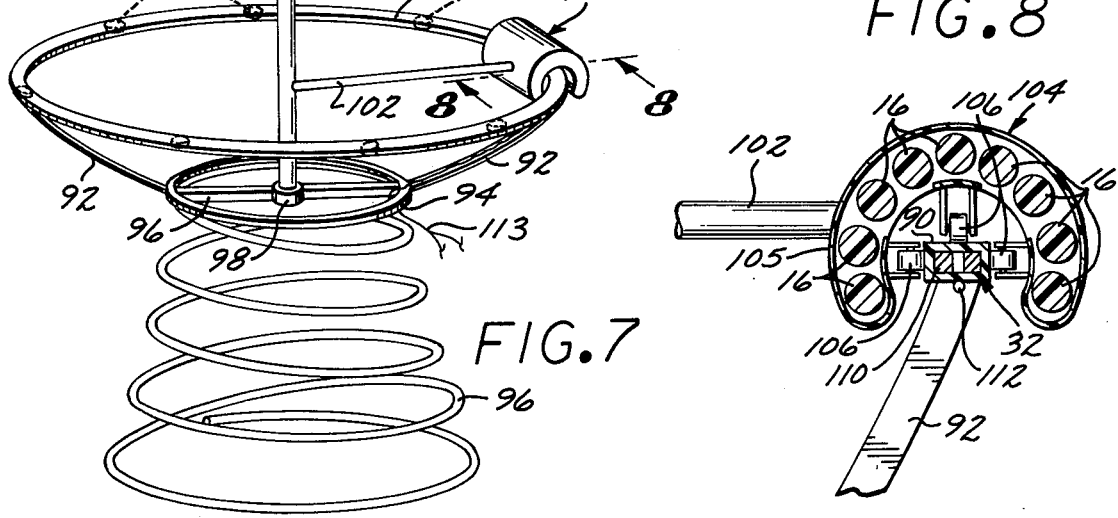

ELECTRICAL DYNAMO

BACKGROUND OF THE INVENTION

1. Field of the Invention

The present invention relates to dynamos for generating alternating electrical current.

2. Description of the Prior Art

Various devices have long been employed utilizing magnetism to generate alternating current. In a conventional electrical generator, an armature carrying a magnet is rotated within a secondary coil of wire. As the magnet rotates, the fluctuating magnetic field acts upon the secondary coil to set up alternating current in the coil windings. Electrical terminals leading from the secondary are provided for connection to tap the alternating electrical power generated.

Conventional devices for generating electrical current in which a magnetic field is moved relative to secondary windings are relatively inefficient, however, because considerable mechanical force is required to effectuate relative movement between the dynamo armature and secondary. As a consequence, the cost of production of electrical power from such conventional systems is inordinately high.

SUMMARY OF THE INVENTION

The present invention involves a system for generating electrical current utilizing relative motion between magnets and a generator secondary, but in which the relative motion between the armature and the secondary is aided by the magnetic field of the armature interacting with other magnetic fields. Specifically, the present invention involves an armature construction having one or more non-magnetic, rotatable cylinders in which transverse pairs of magnets are positioned longitudinally offset from each other, and angularly displaced in a helical pattern. Each magnet in a magnet pair lies radially disposed in a cylinder and diametrically opposite the other magnet in the same pair. The magnets within each pair are separated from each other at the cylinder axis with like poles facing each other. Where more than one rotatable cylinder is employed, the cylinders are located proximate to each other and in parallel disposition, but with the magnet pairs in each cylinder mounted in helically opposite patterns. That is, if the magnet pairs of one cylinder form a right hand helix, the magnet pairs in a parallel cylinder located proximate thereto are disposed in a left hand helical array.

Because all magnet poles of one polarity are located interiorally within the cylinder, and because all opposite poles are located outwardly on the cylinder surface, a magnetic field is established about the cylinder in which the magnetic lines of force at the outwardly directed poles act upon each other and upon the secondary much more strongly than the magnetic lines of force at the radially inwardly directed poles. Once one of the cylinders is rotated, the magnets therein act on proximately positioned cylinders to induce rotation of them. The magnets in adjacent cylinders are positioned in opposing right and left hand helical spirals. Rotation of adjacent cylinders continually brings corresponding magnets of each of the parallel cylinders into close mutually facing relationship. This magnetic interaction aids in rotating the cylinders relative to secondary pickup coils located in the magnetic fields thereof.

The cylinders are preferably rotated through the use of a ring magnet, which moves relative thereto. The ring magnet may be disposed with one pole continuously facing one of the rotatable cylinders with magnets embedded therein. The magnetic interaction between the ring magnet and the proximately positioned cylinder effectuates rotation of that cylinder and further induces secondary rotation by the proximately positioned similarly constructed cylinders having magnets mounted therein in opposing helical spirals.

Numerous alternative configurations of the magnet bearing cylinders, the secondary electrical pickups, and the actuating mechanisms are possible. All of these modifications and alternative embodiments operate upon the concept of employing moving magnetic fields to aid in rotation of the cylinder, or cylinders, which act as an armature in an electrical alternating current generating system. Pickup coils, plates or grids located in stationary fashion form secondaries which are subjected to the influence of the moving magnetic fields of the armature elements.

Some of the possible embodiments of the electric dynamo of the invention may be described with greater clarity and particularity by reference to the accompanying drawings.

DESCRIPTION OF THE DRAWINGS

FIG. 1 is a sectional elevational view illustrating a simple embodiment of the invention.

FIG. 2 illustrates diagramatically an alternative embodiment of the invention employing the component elements of FIG. 1.

FIG. 3 is a sectional plan view taken along the lines 3—3 of FIG. 1.

FIG. 4 is a sectional plan view taken along the lines 4—4 of FIG. 1.

FIG. 5 is a sectional plan view illustrating a more complex embodiment of the invention.

FIG. 6 is a sectional plan view illustrating yet another embodiment of the invention.

FIG. 7 is a perspective view illustrating a further embodiment of the invention.

FIG. 8 is a sectional view taken along the lines 8—8 of FIG. 7.

DESCRIPTION OF THE EMBODIMENTS

Figure 9:
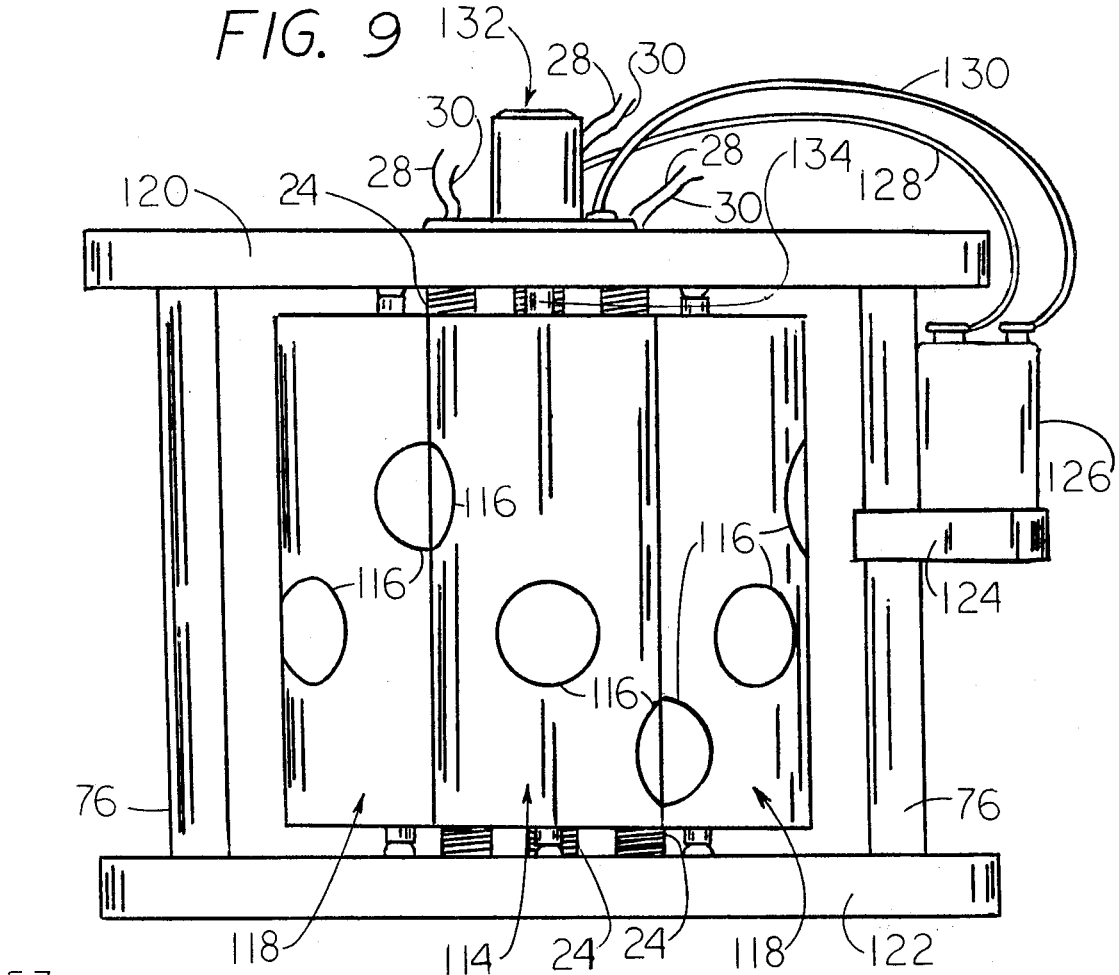
FIG. 9 is an elevational view of a further alternative embodiment of the invention.

FIG. 1 illustrates a pair of flat non-magnetic upper and lower mounting plates 12 and 14 respectively, horizontally disposed and separated so that a cylinder 16, constructed of nonmagnetic, nonconductive material, can be located and rotated therebetween. The cylinder 16 is non-conductive and is formed with stub axles 18 and 20 at its axis having outwardly disposed concave recesses therein which seat opposing steel ball bearings 22. The ball bearings 22 seat within corresponding opposing depressions in the facing surfaces of the flat mounting plates 12 and 14. An electrical pickup secondary 24, comprised of a cylindrical iron rod 26 overwound with coils of wire is also mounted in fixed disposition between the mounting plates 12 and 14. The helically overwound coils of the secondary terminate in electrical leads 28 and 30, across which electrical current is generated. In addition, a disk-like, annular, ring magnetic 32 is mounted for reciprocal movement along an upright post 34 of square cross section that is seated at its opposite ends in the mounting plates 12 and 14. The ring magnet 32 is disposed with its north pole facing the cylinder 16. The post 34 is both parallel to and proximate to the cylinder 16. A pneumatic piston assembly 36 is employed to reciprocate the ring magnet 32 along the post 34.

In one preferred embodiment of the invention the cylinder 16 is formed of solid teflon and is 4 ½ inches long and 1 ¾ inches in diameter. The cylinder 16 is bored through with wells that are directed perpendicular to the cylinder axis but stop short of intersection with the axis. Eight of these wells are directed into the cylinder in pairs that are longitudinally and rotationally displaced from each other. Four different pairs of permanent bar magnets of circular cross section are located within these radial bores. One pair of magnets is depicted in FIG. 3 and is comprised of the magnets 38 and 40. These magnets are magnetized iron rods having a high content of a rare earth metal, such as cobalt. The magnets 38 and 40 are radially disposed in the cylinder 16 diametrically opposite each other and separated from each other by a distance of ¼ inch, with north poles of both magnets facing each other at the cylinder axis. The south poles of magnets 38 and 40 are directed radially outwardly and are ground off to conform to the surface of the cylinder 16 as indicated.

Likewise, the magnets 42 and 44 in the adjacent magnet pair, depicted in FIG. 4, are angularly offset from the pair of magnets depicted in FIG. 3 and are longitudinally spaced therefrom. The magnet pairs indicated at 46 and 48 in FIG. 1 are also angularly offset and longitudinally spaced from each other and, with the magnets 38-44 in the upper magnet pairs, form a helically pattern from one end of the cylinder 16 to the other.

The ring magnet 32 is an annular shaped magnet having a central circular aperture therein. A round bushing with a square hole in the center is mounted in the central aperture of the ring magnet 32 and slides smoothly along the post 34, always maintaining the north pole side 54 in a disposition facing the cylinder 16.

The pneumatic cylinder 36 is periodically pressurized at its lower end to force a piston and piston rod 50 upward rapidly, and then to retract. At the top of the piston rod 50 there is a yoke 52 having legs that straddle the square upright ring magnet guide post 34. The yoke 52 is interposed between the ring magnet 32 and the mounting plate 14. The sudden pressurization of the pneumatic cylinder 36 rapidly forces the piston rod 50 upward and the yoke 52 carries the ring magnet 32 to the vertical level of the magnets 38 and 40 in the cylinder 16. As the ring magnet 32 descends under the force of gravity, the north pole side 54 exerts an attractive force on the outwardly directed south poles of the magnets 38 and 40. The attractive force causes the cylinder 16 to rotate clockwise, as viewed in FIGS. 3 and 4. By the time that one of the magnets 38 or 40 approaches the ring magnet 32, however, the descent of the ring magnet 32 under the force of gravity has carried it downward so that the attractive force between the ring magnet 32 and the magnet 38 or 40 is relatively weak compared to the attractive force acting between the north pole 54 of the ring magnet 32 and the south pole end of one of the magnets 42 or 44 of FIG. 4. This attractive force continues to rotate the cylinder 16 in a clockwise fashion, as viewed in FIGS. 3 and 4.

The further descent of the ring magnet 32 similarly acts upon the magnets in the magnet pairs 46 and 48 to effectuate continuous clockwise rotation of the cylinder 16. Once the ring magnet 32 descends under the force of gravity to the position depicted in FIG. 1, the pneumatic cylinder 36 is again actuated by a limit switch to propel the ring magnet 32 upward into registration with one of the bar magnets 38 or 40. The ascent of the ring magnet 32 is so rapid under the sudden pneumatically actuated upward force exerted by the yoke 52, that the inertia of the cylinder 16 continues to carry it in clockwise rotation, so that the cylinder 16 does not begin to rotate counterclockwise under the influence of the ring magnet 34.

As the cylinder 16 rotates clockwise under the rotational influence imparted by the ring magnet 32, the bar magnets in the cylinder 16 act upon the wound wire loops in the secondary coil 24 to produce an alternating electric current between the electrical terminal leads 28 and 30. Continued clockwise rotation of the cylinder 16 produces a continuing alternating current between the leads 28 and 30.

The positioning and dimensioning of the component parts of the invention relative to each other is extremely important, although a wide variety of alternative embodiments, utilizing alternative spacing and dimensions is possible. In one form of the embodiment of the invention of FIG. 1 the cylinder 16 is nominally 4 ½ inches long and 1 ¾ inches in diameter. The cylinder 16 is 4 ¾ inches in length, with one 1/16th of an inch added to each end beyond the nominal length to compensate for the grinding of the bar magnets therein flush with the cylinder surface. The axial center lines of the magnets 38 and 40 are ⅝ths of an inch from the top transverse surface 53 of the cylinder 16, and similarly there is ⅝ths of an inch between the bottom transverse end 55 of the cylinder 16 facing the mounting platform 14 and the center line of the bar magnets in the magnet pair 48. The bar magnets in the cylinder 16 are all ¾ inches in diameter and ¾ inches in length. The clearance between the positive or north poles of the magnets at the center of the rod is ¼ inch.

The magnets in the magnet pairs 46 and 48 are located 1 ¼ inch apart across the curved surface of the cylinder 16, from center to center, indicated by the distance D in FIG. 1. This distance is actual measured distance across the curved surface of the cylinder 16. Similarly, the center of the magnet 42 at the surface of the cylinder 16 is also a distance of 1 ¼ inches from the center of the visible magnet in the magnet pair 46. Likewise, the center of the magnet 38 is 1 ¼ inches distant from the center of the magnet 42, although the magnet 38 is not visible in FIG. 1.

Figure 10:
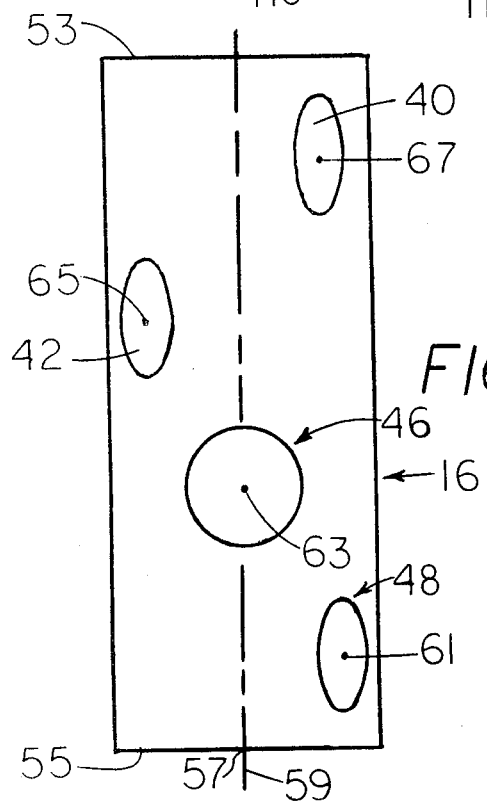
FIG. 10 is a diagram illustrating spacing of magnets within the cylinder of FIG. 1.

Spacing of the magnets in the cylinder 16 is further illustrated in FIG. 10. A point of reference for measurement is the intersection of the axis 59 of the cylinder 16 with the transverse surface 55. This intersection is denoted by the reference numeral 57. The distance from the intersection 57 to the centers 61 of the surfaces of the south poles of the magnets in the magnet pair 48, as measured through the volume of the cylinder 16, is 1 1/16th inches. The distance from the intersection 57 to the centers 63 of the south poles at the surface of the cylinder 16 of the magnets in the magnet pair 46 is 1 ¼ inches. The distance from the intersection 57 to the centers 65 of the exposed surfaces of the magnets 42 and 44 is 2 1/16th inches. The distance from the intersection 57 to the centers 67 of the exposed south pole surfaces of the bar magnets 38 and 40 is 4 inches.

The minimum number of bar magnets that can be utilized with any embodiment of the invention is eight. However, a greater number of bar magnets may be utilized for cylinders longer than the cylinder 16 of FIG. 10. For example, in a cylinder that is 1 ½ inches in diameter and 10 feet in length, 80 magnets should be provided. The size of the bar magnets may also vary, depending upon the diameter of the cylinder.

The exact diameter of the ring magnet 32 is not critical. However, the field strength exerted by the north pole 54 of the ring magnet 32 upon the bar magnets, when positioned at the same vertical level, must be as great as the strength of the magnetic field exerted by a bar magnet facing the north pole 54 of the ring magnet 32. The exact positioning of the coil 24 is not critical, although it should be sufficiently distant from the ring magnet 32 so that the magnetic field of the ring magnet 32 does not mask the greater changes in magnetic flux that act upon the coil 24 from the movement of the bar magnets in the cylinder 16.

An alternative embodiment of the invention is depicted diagrammatically in FIG. 2. FIG. 2 is a sectional view looking downward upon an alternative embodiment of the invention from just below the upper flat mounting plate, corresponding to the mounting plate 12 of the embodiment of FIG. 1. The lower flat mounting plate is indicated at 14' in the embodiment of FIG. 2. Four different cylinders 16 with magnets mounted therein as depicted in FIG. 1 are located in an encircling array about a smaller central cylinder 16' of proportional, but smaller dimensions. In this embodiment, a plurality of ring magnets 32 are provided, diametrically opposite the central cylinder 16' to act upon a specific one of the cylinders 16. A plurality of secondary coils 24 are provided, each positioned equidistant from two different ones of the cylinders 16.

It is essential to the operability of the embodiment of FIG. 2 that the adjacent cylinders 16 can be of opposite helical spiral orientation, and of equal helical pitch. That is, if cylinder 16 at the twelve o'clock position in FIG. 2 has magnets located therein, as in FIG. 1, in a left hand spiral, the cylinders 16 at the three and nine o'clock positions must contain magnets as in FIG. 1, but in right hand helical spirals. By the same token, the lowermost cylinder 16 at the six o'clock position in FIG. 2 must contain magnets in a left hand helical spiral. With this helical orientation the rotation of any one of the cylinders 16 will be matched by the counter rotation of the cylinders adjacent thereto so that the opposing magnets in equivalent vertical levels of adjacent cylinders 16 will be brought into close proximity to each other as the cylinders rotate. That is, as adjacent cylinders 16 rotate, the magnets 38 will first be brought in face-to-face relationship to act in a maximum strength upon the secondary coil 24 located between the adjacent cylinders. Further rotation will bring the magnets 42 close to each other to act upon the secondary coil 24, and so forth.

This characteristic is more clearly depicted in conjunction with the embodiment of FIG. 5. In the embodiment of FIG. 5, six different cylinders 60-65 encircle three of the secondary pickup coils 24. These six cylinders 60-65 are of identical construction to the cylinder 16 of FIG. 1, except that some the cylinders 661, 63 and 65 have transverse bar magnets mounted therein in a right hand helical spiral pattern, while the cylinders 60, 62 and 64 have transverse bar magnets mounted therein in a left hand helical pattern.

The six cylinders 60-65 all have the dimensions of the cylinders 16 of FIG. 1. The uppermost four magnets 38-44 have been illustrated diagrammatically on the cylinders 60 and 65. The ring magnet 68 will rotate the cylinder 65 counterclockwise when operated by a pneumatic cylinder 36 in the manner explained in conjunction with FIG. 1. The cylinder 65, in turn, will act upon the adjacent cylinders 60 and 64 having magnets located therein in oppositely oriented helical spirals. That is, as the cylinder 65 rotates counterclockwise, as depicted in FIG. 5, it will act upon the cylinder 60 to rotate that cylinder clockwise. This rotation will be effectuated by the interaction of the opposite poles of the corresponding magnets 38 as they pass proximate to each other as depicted. As the cylinders 65 and 60 continue in their rotation and counter-rotational movement, the magnets in the next lower vertical level will act upon each other. That is, the corresponding opposite poles of the magnets 42 will draw near each other as the cylinders 65 and 60 continue in their rotational movement. The driving force of the ring magnet 68 will therefore set up rotational and counter-rotational movement in all of the cylinders 60-65. This movement is aided by the corresponding driving force imparted by the ring magnet 70, located directly opposite the ring magnet 68 and in position to act directly upon the magnets of the cylinder 62.

It can be seen that the corresponding opposite poles of the magnets and the counter-rotating cylinders act upon the secondary pickup coils 24 positioned equalidistant from two different adjacent ones of the cylinders 60-65. Once rotation of any one of these cylinders 60-65 has been initiated, that cylinder will act upon the other cylinders in the array to cause rotation thereof. The continued driving force imparted by the ring magnets 68 and 70 effectuates a continued rotational movement of the cylinders 60-65 in the directions indicated with very little power input. The electrical output on the leads 28 and 30 of the secondary pickup coils 24 is remarkably high and represents an extremely efficient conversion of magnetic flux and mechanical energy to electrical current.

In the embodiment of FIG. 5, the ring magnets 68 and 70 have annular, smooth low friction bearing guide bushings 72 at their centers to hold the north poles 54 of the ring magnets 68 and 70 in a disposition facing the cylinders 65 and 62, respectively. The square apertures in the bushing 72 coact with the guide posts 34 to limit rotational movement of the ring magnets 68 and 70 and restrict movement thereof to vertical motion along the upright square guide posts 34.

The ring magnets 68 and 70 are moved by pneumatic pistons 36 through yokes 52 in the manner described in conjunction with FIG. 1. Spacer bolts 76 are positioned at intervals and are used to hold the bottom mounting plate 78 and a corresponding upper mounting plate (not shown) in horizontal spaced disposition.

Yet another embodiment of the invention is depicted in FIG. 6. In this embodiment, nine cylinders 80-88 all constructed according to the description of the cylinder 16 of FIG. 1 are mounted in an encircling arrangement about a larger central cylinder 89, of like construction, but proportionately larger. As in the other embodiments, each of the cylinders 80-89 contains a helical spiral of pairs of transverse bar magnets arranged in the configuration illustrated in FIG. 1 and described in conjunction therewith. Secondary pick-up coils 24, of the type described in conjunction with FIG. 1 are spaced proximate to adjacent ones of the cylinders 80–88, as indicated and all in the vicinity of the larger cylinder 89, so as to be subjected to the influence of the magnetic flux patterns of the magnets therein. As in the other embodiments described, ring magnets 32 maybe provided as indicated. The ring magnets 32 are positioned between adjacent counter-rotating cylinders as indicated, and are operated for reciprocal movement along upright square guide posts 34 with north poles directed inwardly radially toward the center cylinder 89. Pneumatic pistons propel the ring magnets 32 rapidly vertically upward, whereupon their descent under the influence of gravity creates rotational and counter-rotational motion of adjacent cylinders 80–88 and 89. The movement of the magnetic lines of force set up by the magnets transversely disposed in these cylinders acts upon the magnetic pick-up coils 24 to produce electric current at the output terminal leads therefrom. Each of the ring magnets 32 is separately under the control of a separate pneumatic cylinder 36.

In the configuration of FIG. 6 one pneumatic system is preferred to move only the center cylinder 89 with a crank arm attached to drive the cylinder 89 in rotation. This configuration moves slower but produces greater electricity than the embodiment as depicted in FIG. 6.

The ring magnets 32 can be used positioned the way they are depicted in FIG. 6, or the center cylinder 89 can move in rotation positioned the way it is.

A disposition of adjacent cylinders with magnets arranged in helical spirals in the same direction is desirable. Because of the uneven number of cylinders 80–88 in the embodiment of FIG. 6, all of the adjacent cylinders 87 and 88 will rotate in the same direction. When uneven numbers of cylinders are present in a cluster arrangement, such as in FIG. 6, all of the outside cylinders must rotate in the same direction and have the same spiral while the larger cylinder in the center must have an opposite spiral. The larger cylinder will then turn all of the outside cylinders, but only in a cluster configuration in which several cylinders surround a central cylinder.

Yet another embodiment of the invention is depicted in FIG. 7. In this arrangement, it is the cylinders 16 which move longitudinally relative to the ring magnets 32, rather than the reverse situation in the other embodiments previously described. In the embodiment of FIG. 7, a circular nonmagnetic track 90 is mounted generally horizontally by upwardly curved non-magnetic struts 92 upon a laterally disposed supporting non-magnetic annular hoop 94. The hoop 94, in turn, is mounted upon a resilient spring 96 which is flexible and which supports the circular track 90 in resilient fashion. The hoop 94 includes a transverse cross bar 96 having a hub 98 at its center and from which an axle shaft 98 extends vertically upward. At the upper extremity of the axle shaft 92 there is an impeller 100, which may be turned by wind, water or any other mechanical rotational force. A transverse cantilevered rod-like arm 102 extends radially outwardly from the axle shaft 98 and carries at its end an armature 104, depicted in detail in FIG. 8. The armature 104 has a generally tunnel-like horseshoe shaped housing 105 within which cylinders 16, with magnets embedded therein as previously described, are mounted, for rotation about separate axes parallel to a tangent to the track 90 at the location of the armature 104.

As previously noted, each of the cylinders 16 contains a plurality of longitudinally spaced pairs of permanent magnets mounted therewithin and angularly offset from each other in helical spirals of equal pitch and opposing direction, as explained in connection with the embodiment of FIGS. 1, 2, 5. The armature 104 is equipped with three inwardly directed follower wheels 106, visible in FIG. 8, which steady the movement of the armature 104 along the track 90.

Within the track 90 a plurality of ring magnets 32 are embedded at spaced intervals with south poles facing radially inwardly toward the axle shaft 98. The inwardly facing south magnetic poles of each of the ring magnets 32 are covered with a magnetic flux dampener, such as semicircular carbon steel shields 110. The purpose of the shields 110 is to weaken the magnetic flux imparted by the inwardly directed south poles of the ring magnetic 32. This increases the efficiency of magnetic flux and mechanical energy conversion to electrical current. The magnetic field set up by each of the outwardly directed north poles of the ring magnets 32 must be four times as great as the field set up by the magnets of any one of the cylinders 16.

A loop of conductive secondary wire, indicated at 112, is located adjacent to and follows the circular track 90 and has electrical output termination leads 113 that extend down one of the stuts 92.

Under the initiating influence of the impeller 100, the armature 104 is carried in rotation at the end of the arm 102 along the track 90. As the armature 104 passes over the ring magnets 32 which are spaced at intervals in the track 90, the interaction between the magnets in the cylinders 16 and the ring magnets 32 causes all of the cylinders 16 to begin to rotate. Rotation of one cylinder produces counter-rotation in another cylinder, so that all of the cylinders 16 interact with each other to rotate in tandem. The changing magnetic field produced by the rotating bar magnets in each of the cylinders 16 acts upon the secondary pickup wire 112 located beneath the track 90 and generates an alternating current therein.

As the impeller 100 drives the armature 104 and the armature 104 picks up speed, it produces an oscillating force that tends to rock the track 90 from side to side. By providing the resilient support of the spring 96, little friction is produced as a result of this rocking motion. Rather, the conversion of energy is highly efficient. Also, it is possible to position more than one armature 104 on the track 90 at any time. The several armatures need not rotate synchronously. Indeed, one may well accelerate ahead of the other and even strike the armature ahead of it. However, this does not adversely effect the production of electrical current in the secondary wire 112.

Another embodiment of the invention is depicted in FIG. 9. This embodiment employs a d.c. power source to produce an a.c. output, in highly efficient fashion. A driving cylinder 114 contains transverse bar magnets 116 located therein in the manner previously described in a left hand spiral pattern as depicted. Three other driven cylinders 118 are provided. The cylinders 114 and 118, are arranged in an encircling ring about several upright secondary coils 24 of the type previously described. The coils 24 each include electrical terminals 28 and 30 across which alternating current flows. The cylinders 118 are of construction identical to that of the cylinder 114, with the exception that the bar magnets 116 located therein are arranged in a right hand spiral fashion, rather than the left hand spiral as in the cylinder 114. The cylinders 114 and 118 are vertically mounted for rotation about axes in the manner described in conjunction with FIG. 1 between an upper mounting plate 120 and lower mounting plate 122. The mounting plates 120 and 122 are laterally expansive and horizontally disposed and held together by spacing rods 76 of the type described in conjunction with the embodiment of FIG. 5.

A mounting bracket 124 is provided on one of the spacing rods 76 and a small 12 volt d.c. battery 126 is provided thereon. One terminal of the d.c. battery 126 is connected to a lead 128 while the other terminal of opposite polarity is connected to a lead 130. A small d.c. electric motor 132 is positioned atop the upper mounting plate 120 and has a motor shaft extending through an aperture therein and visible at 134. The motor shaft 134 acts as a drive shaft for the cylinder 114. As the cylinder 114 rotates, the magnetic fields of the bar magnets 116 therein cause the other cylinders 118 to rotate in sychrony therewith. As the cylinders 114 and 118 rotate, the changing magnetic flux produced by the bar magnets 116 acts upon the secondary coils 24 to produce alternating current at the output leads 28 and 30 of the secondary coils 24. The conversion of d.c. to a.c. is highly efficient.

Figure 11:
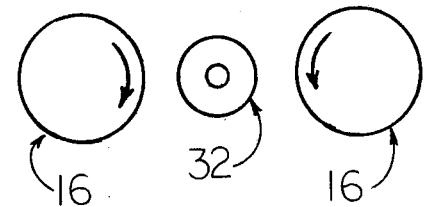
FIG. 11 is a diagram of yet another embodiment of the invention.

It should be understood that numerous variations and modifications of the present invention are possible. For examle, in place of the secondary pickup coils 24, or the circular pickup wire 112, conductive plates can be positioned proximate to the fluctuating magnet fields set up by the rotation of the cylinders 16. Current can be drawn from secondaries of this type or from nonmagnetic grids or other secondary current conductors. Also, numerous configurations of cylinders, armatures, secondaries and ring magnets can be employed to obtain electrical current according to the invention. For example, a pair of the cylinders 16, of like construction as described in connection of FIG. 1, and containing magnet pairs arranged in opposite helical spirals of equal pitch may be provided on either side of a single ring magnet 32, as depicted in FIG. 11. The cylinders thus positioned will rotate in opposite directions, and will set up changing magnetic fields, which can act upon a proximately position secondary or plurality of secondaries to generate a electrical current.

Because of all the numerous permutations of structural combinations which can be employed to advantage, all in accordance with the present invention, the scope of the invention should not be limited to the specific embodiments depicted, but rather is defined in the claims appended hereto.

I claim:

1. An electrical generator comprising
   at least one non-conductive cylinder mounted for rotation about an axis, and containing a plurality of longitudinally spaced pairs of permanent magnets mounted therewithin angularly offset from each other in a helical array, the magnets in each pair being radially disposed in said cylinder diametrically opposite each other and separated from each other at the cylinder axis with like poles facing each other,
   at least one secondary having electrical leads across which current is generated,
   at least one ring magnet having an axis parallel and proximate to said cylinder, and
   means for reciprocating said ring magnet along its axis.

2. An electrical generator according to claim 1 further characterized in that said secondary includes a coil located proximate to said cylinder and extending parallel thereto and having windings thereon terminating in said electrical leads.

3. An electrical generator according to claim 1 further characterized in that said secondary includes a conductive plate extending perpendicular to said cylinder 4. An electrical generator according to claim 1 further comprising a plurality of said cylinders located in an encircling array with a plurality of said coils disposed within the enclosure of said array,
   a pluarality of said ring magnets and means for separately reciprocating all of said ring magnets are located outside and proximate to said encircling array of cylinders.

5. An electrical generator according to claim 4 further characterized in that six of said cylinders encircle three of said coils, and said coils are each equidistant from two different adjacent cylinders, and two of said ring magnets are provided at 180° angular displacement intervals from each other about said encircling array of cylinders, and the magnets within adjacent cylinders are oriented in opposite helical sprials of equal pitch.

6. An electrical generator according to claim 4 further characterized in that nine of said cylinders encircle a larger central cylinder of like construction and containing a helical spiral of pairs of magnets as aforesaid, and five of said ring magnets are provided at displaced intervals from each other about said encircling array of cylinders.

7. An electrical generator according to claim 4 further characterized in that four of said cylinders encircle a smaller central cylinder of like construction and containing a helical spiral of pairs of magnets as aforesaid, and four of said ring magnets are provided at 90° angular displacement intervals from each other about said encircling array of cylinders.

8. An electrical generator according to claim 4 further characterized in that a plurality of said coils are provided proximate to each cylinder.

9. An electrical generator according to claim 1 further comprising a pair of said cylinders of like construction with magnets therein arranged in opposite helical spirals of equal pitch on either side of said ring magnet.

10. An electrical generator comprising a circular non-magnetic track, ring magnets embedded at spaced intervals in said track with all poles of one polarity facing radially inwardly, non-magnetic mounting means supporting said track at discontinuous connections, a conductive secondary wire located adjacent to and following said track and having electrical output termination leads, an armature mounted for movement along said track and containing a plurality of non-conductive mutually parallel cylinders mounted adjacent to each other for rotation about axes parallel to a tangent to said track at said armature location, each cylinder containing a pluarlity of longitudinally spaced pairs of permanent magnets mounted therewithin angularly offset from each other in helical spirals, the spiral of magnets in said cylinders being of equal pitch and opposing direction, and the magnets in each pair are radially disposed in a cylinder diametrically opposite each other and separated from each other at the cylinder axis with like poles facing each other.

11. An electrical generator according to claim 10 further comprising magnetic flux dampening means positioned at the radially inwardly directed poles of said ring magnets to weaken the magnetic field therefrom acting upon said pairs of magnets in said cylinders.

12. An electrical generator according to claim 10 further characterized in that said mounting includes flexible means to resiliently support said track.

13. An alternating current generator comprising
a plurality of non-conductive cylinders mounted for rotation about proximately located parallel axes, each cylinder containing a plurality of longitudinally spaced pairs of permanent magnets mounted therewithin angularly offset from each other, in a helical array, the magnets in each pair being radially disposed in a cylinder diametrically opposite each other and separated from each other at the axis of the cylinder within which they are located with like poles facing each other, and one of said cylinder is a drive cylinder with the helical array of magnet pairs therein oriented in one direction, and the other cylinders are driven cylinders with the helical arrays of magnet pairs therein all oriented in the opposite direction,
at least one secondary located proximate to said cylinders and having electrical leads across which alternating current is produced,
driving means for rotating said drive cylinder, whereby said drive cylinder in turn rotates said driven cylinders, and
means for powering said drive means.

* * * * *